United States Patent [19]

Jackson et al.

[11] 4,423,460
[45] Dec. 27, 1983

[54] BULK TAPE ERASER WITH ROTATING MAGNETIC FIELD

[75] Inventors: Leon D. Jackson, Troy; Dan O. Morris, Clawson, both of Mich.

[73] Assignee: LDJ Electronics, Inc., Troy, Mich.

[21] Appl. No.: 336,653

[22] Filed: Jan. 4, 1982

[51] Int. Cl.³ .............................................. H01F 13/00
[52] U.S. Cl. .................................... 361/151; 361/149
[58] Field of Search ................................ 361/151, 149

[56] References Cited

U.S. PATENT DOCUMENTS

| | | | |
|---|---|---|---|
| 2,378,388 | 6/1945 | Begun | 361/151 X |
| 3,191,102 | 6/1965 | Lambeir et al. | 361/151 |
| 3,506,884 | 4/1970 | McKinley | 361/151 |
| 3,711,750 | 1/1973 | Huffman et al. | 361/151 X |

Primary Examiner—Reinhard J. Eisenzopf
Attorney, Agent, or Firm—Krass, Young & Schivley

[57] ABSTRACT

Apparatus is disclosed for bulk erasing magnetic tapes spirally wound on a carrier. A pair of magnetic structures are spaced apart by an air gap of sufficient width to receive the tape carrier. Circuitry is provided for producing a rotating magnetic field in the air gap substantially parallel with the tape. Preferably, the magnetic structures take the form of multi-legged iron cores. The cores are mounted so that corresponding legs on opposing cores have the same magnetic polarity. A phase shifter circuit is adapted to supply currents 90° out of phase with one another to selected pairs of legs in the cores to create a rotating magnetic field in the air gap.

9 Claims, 6 Drawing Figures

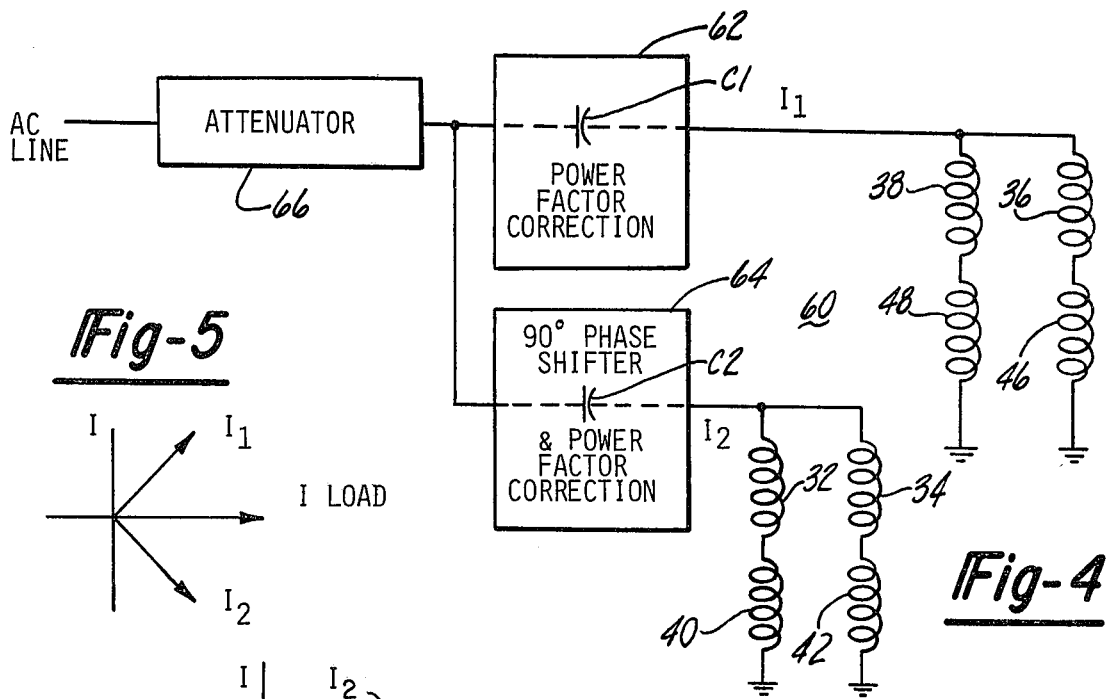
*Fig-5*
*Fig-4*
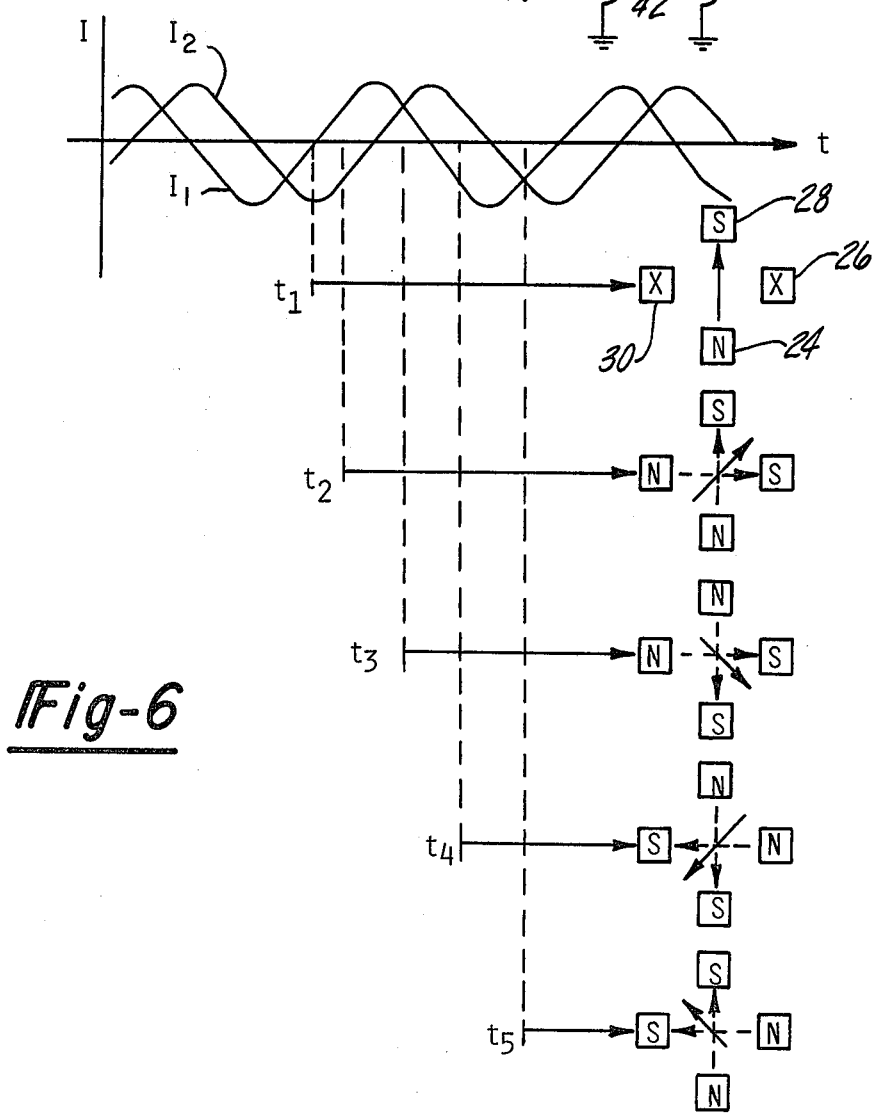
*Fig-6*

BULK TAPE ERASER WITH ROTATING MAGNETIC FIELD

DESCRIPTION

1. Technical Field

This invention relates to devices for erasing magnetic tapes. More particularly, it involves a bulk tape eraser using an alternating current (AC) degaussing head.

2. Background Art

Magnetic tapes are used in a wide variety of applications. For example, spiral wound magnetic tapes have been used to temporarily store computer data, video and/or audio information, and many other types of magnetically recorded signals. The popularity of magnetic tapes is due in large part to their reusability. In order to reuse the tapes the recorded information must be erased. The technique of erasing magnetic tapes is often referred to as degaussing. In general, degaussing techniques serve to realign the magnetic domains of the particles on the tapes into a random orientation. The data on the tape can be destroyed by the use of a steady state magnetic field which simply randomly orients the magnetic domains in the same direction. However, when the tape is reused the uniformly oriented magnetic domains may create unwanted "magnetic" noise.

Bulk tape erasers are used to substantially simultaneously erase all of the data on a spiral wound medium such as a computer tape reel or cassette. Conventional bulk tape erasers utilize an iron core having coils wound thereon the create magnetic flux lines in a given direction. In order to obtain random orientation of the magnetic particles on the tape, either the tape or the coil has to be rotated. Normally, a stationary degaussing head is used and the tape is passed underneath the head several times in different directions and different annular orientations. It is apparent that this technique requires a considerable amount of time and there still is no assurance that the magnetic domains will be sufficiently randomly oriented throughout the entire volume of the tape.

Conventional bulk tape erasers often failed to produce high strength magnetic fields. Consequently, the task of erasing the now popular high coercivity tapes is difficult to obtain using normal procedures. Permanent magnet systems have also been constructed to erase tape. It has even been suggested to rotate the permanent magnets. However, the mechanisms for physically rotating the magnets create unwanted noise in the tapes.

DISCLOSURE OF THE INVENTION

Apparatus is provided pursuant to the present invention for erasing spiral wound magnetic tapes. The apparatus includes two "soft" magnetic structures spaced by an air gap of sufficient width to receive a tape carrier such as a reel or cassette. Circuitry coupled to the structures is provided for producing a rotating magnetic field in the air gap substantially parallel with the circumferential direction in which the tape is wound about the carrier; i.e., in a plane transverse to the axis of the carrier. The apparatus provides a strong rotating magnetic field permitting complete erasure of even high coercivity tapes in one pass of the tape through the air gap. Since there are no physically moving parts the degaussing head can be made relatively inexpensively and noise is kept to a minimum.

In the preferred embodiment, the apparatus uses a two piece multi-legged iron core structure. Each leg includes current carrying windings thereon. Each diametrically opposing pair of legs in each core is wound for opposite magnetic polarity. The two cores are oriented such that they mutually face each other with legs having the same magnetic polarity in spaced alignment. Currents applied to the leg windings are phase shifted such that adjacent pairs of legs are supplied with currents a predetermined amount out of phase. In the disclosed embodiment there are four legs or two pairs of opposing legs in each core. The current applied to one pair of legs is ninety degrees (90°) out of phase with the current applied to the other pair of legs to thereby create a rotating magnetic field in the air gap between the cores.

The circuitry may also include power factor correction circuitry employing capacitors of selected values to minimize the current draw from the power source. Means are also provided for attentuating the magnetic field in the air gap.

BRIEF DESCRIPTION OF THE DRAWINGS

These and other advantages of the present invention will become apparent to one skilled in the art upon a study of the following specification and by reference to the drawings in which:

FIG. 4 is a block diagram of circuitry which may be used in connection with the present invention;

FIG. 5 is a vector diagram illustrating the phase relationship between currents employed in the degaussing head; and FIG. 6 is a chart illustrating the effect of the input currents to the windings on the direction of the magnetic flux created in the degaussing head.

DESCRIPTION OF THE PREFERRED EMBODIMENT

Figure 1:
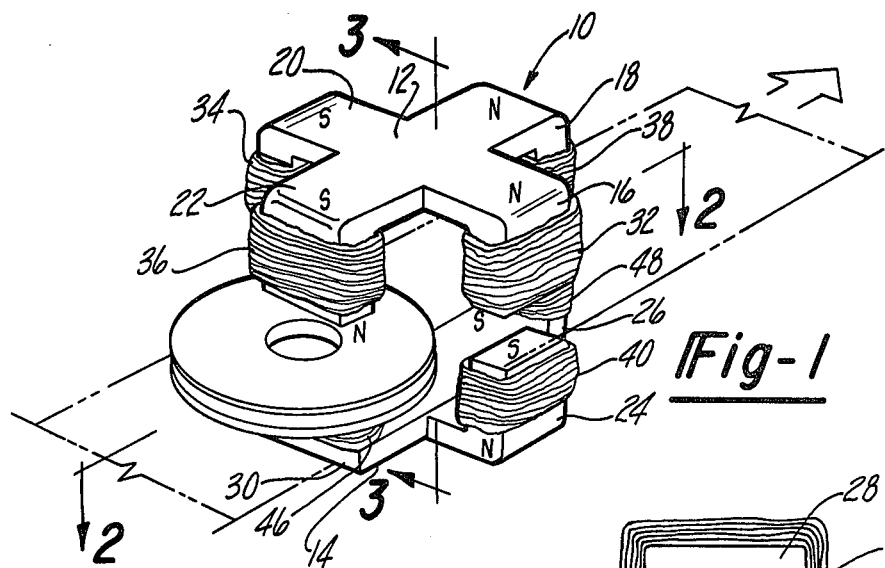
FIG. 1 is a perspective view of a bulk tape eraser device made in accordance with this invention.
Figure 2:
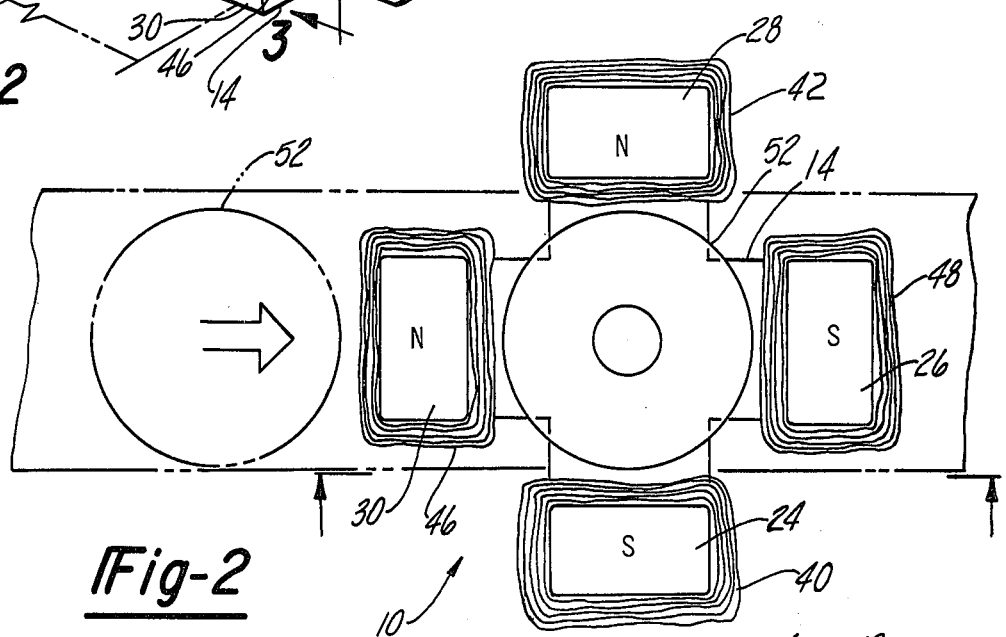
FIG. 2 is a plan view of the degaussing head along the lines 2—2 of FIG. 1.
Figure 3:
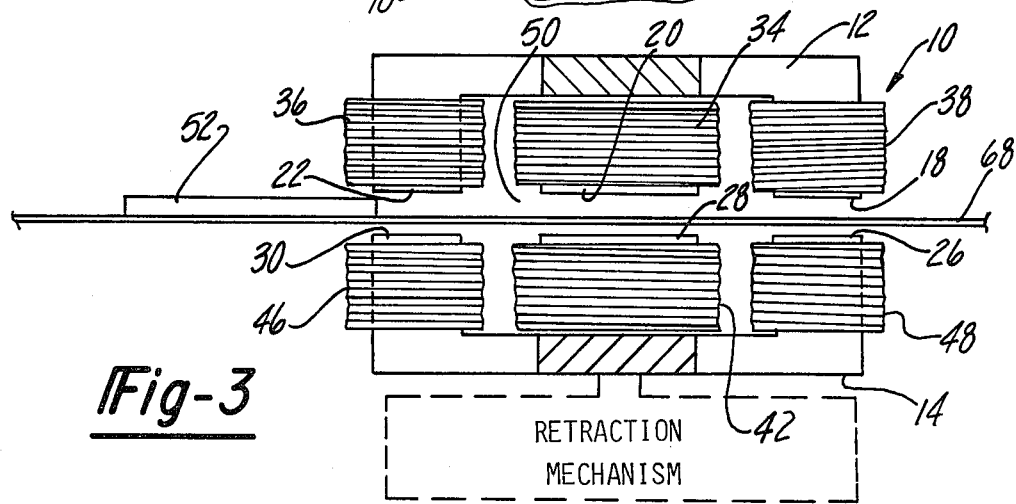
FIG. 3 is a cross sectional view along the lines 3—3 of FIG. 1.

Turning now to FIGS. 1-3, degaussing head 10 employs two multi-legged core structures 12 and 14. Each core is substantially identical and is made of iron having high magnetic permeability and low hysteresis characteristics, known in the art as "soft" magnetic material. Upper core 12 includes four depending legs 16, 18, 20 and 22. Lower core 14 similarly includes legs 24, 26, 28 and 30. Each leg includes windings which are wound in such a manner that each leg serves as a pole with a given magnetic polarity. Each pair of diametrically opposing legs in each core is wound so that each leg has an opposite magnetic polarity. For example, windings 32 on leg 16 are wound so as to make the lower face of leg 16 a south pole whereas windings 34 on leg 20 define its lower face as a north pole. Similarly, windings 36 and 38 define legs 22 and 18 as north and south poles, respectively. It should be understood that the north/south pole designation is used to simplify the description of this invention. Those skilled in the art will recognize that when AC current is utilized in the windings that their magnetic polarities actually fluctuate depending upon the electrical polarity of the current. Completing the winding scheme for lower core 14, windings 40 and 42 are wound so that legs 24 and 28 are south and north poles, respectively; and windings 46 and 48 define legs 30 and 26 as north and south poles, respectively.

Cores 12 and 14 are mounted on suitable supporting structures (not shown) to hold them in the orientation shown in the drawings. The cores 12 and 14 mutually face each other such that legs having the same magnetic polarity are in spaced alignment with each other. The cores 12 and 14 are spaced apart by an air gap 50. The air gap 50 is sufficiently wide so as to receive the thickness of spiral wound tape reel 52 as can be seen in FIG. 3. Preferably, the legs of each core are spaced apart to define an inner circumferential area approximately the same as the circumference of the tape reel 52 as can be seen in FIG. 2.

The circuitry for supplying current to the degaussing head 10 will now be described in connection with FIGS. 4-6. The function of circuitry 60 is to provide current to the coils in degaussing head 10 in such manner so as to produce a rotating magnetic field in the air gap 50 substantially parallel with the circumferential direction in which the tape is wound about reel 52, i.e. transverse to the axis of reel 52. In this embodiment the current I1 is 90° out of phase with current I2. Current I1 is supplied to coils 36, 38, 46 and 48. Current I2 is supplied to coils 32, 34, 40 and 42. Thus, it can be appreciated that opposing pairs of legs in the cores will be supplied with the same current whereas adjacent opposing pairs of legs will be supplied with current 90° out of phase with the first current.

The phase relationship of the currents and the magnetic polarities of the windings cooperate to provide a rotating magnetic field in the horizontal plane, assuming a horizontal orientation of the cores. This phenomena can be more easily understood with reference to FIG. 6 which illustrates the direction of the magnetic flux in lower core 14 as a function of time. The magnetic flux in upper core 12 will act identically and thus a description with respect to lower core 14 will suffice. At time t1, current I1 applied to legs 26 and 30 is at a zero level. Thus, no magnetic flux is generated between the two poles at this time. Current I2, however, has a negative electrical polarity at this time thus causing flux to be generated from leg 24 in the direction of leg 28. The solid arrow in FIG. 6 represents the magnetic force field vector. At time t2 current I1 is positive whereas current I2 is negative. This causes magnetic flux to travel from legs 24 and 30 to legs 28 and 26, respectively. The summation of the individual force fields results in a clockwise rotation of the composite force field vector. At time t3 both currents I1 and I2 are positive causing magnetic flux now to flow from leg 28 into leg 24 resulting in a magnetic field vector at an angle of about 135°. At time t4, I1 becomes negative causing flux to flow from leg 26 to leg 30 resulting in further clockwise rotation of the magnetic force field vector. At time t5, I2 becomes negative thereby reversing the magnetic flux flow from leg 24 to leg 28 finishing out the rotation of the magnetic field.

One skilled in the art will appreciate that there are many ways to provide currents which are out of phase to one another. Circuitry 60 shown in FIG. 4 is well suited to perform this function. In this example, AC line current is split and fed to two circuits 62 and 64. With additional reference to FIG. 5, circuit 62 includes a capacitor C1 which serves to shift the phase of the line current about 45°. Circuit 64 includes a capacitor C2 of sufficient value to shift the line current to about 135°. Such an operation not only serves to shift current I2 90° out of phase with I1 but it also operates to minimize the current draw of the apparatus because of its power factor correction capability. Circuitry 60 may also include an attenuator circuit 66 for the reasons to be later described.

With special reference to FIG. 3 the method of using the above-described apparatus will be explained. Tape reel 52 is placed on a suitable conveyor 68 which carries reel 52 through air gap 50 in degaussing head 10. Tape reel 52 in this example is a well known spiral wound computer tape reel, the tape being wound in the horizontal direction about the spindle or hub of the reel. When reel 52 passes rightwardly through air gap 50 the tape experiences a rotating magnetic field parallel with the tape. The rotating magnetic field in the horizontal plane operates to erase the data on the tape and randomly orient the magnetic domains of the particles on the tape. All this occurs without having to rotate either the reel 52 or parts of the degaussing head 10. The structure of the degaussing head of the present invention is such that it is capable of producing high magnetic fields sufficient to erase high coercivity tapes, such as those using metal particles or chrome/cobalt tapes with a high degree of success.

It is advantageous to attenuate the magnetic field applied to the tape to be erased. This can be accomplished in a variety of manners. For example, the use of conveyor 68 will serve to vary the magnetic field applied to the tape as it traverses through the air gap in the degaussing head 10. This is because the magnetic flux at either end of the head 10 will be less than that in the middle portion. Alternatively, reel 52 can be placed in a stationary location in the middle of head 10 and one (or both) of the cores can be retracted to attentuate the magnetic field. Retraction mechanism 70 is illustrated in FIG. 3 for this purpose. The attenuation of the magnetic field may also be accomplished electrically by way of attenuator circuit 66. Circuit 66 may take the form of a manually operated potentiometer or suitable devices for automatically adjusting the amplitude of the input current.

It should be apparent to one skilled in the art that the number and position of the legs in the cores could be changed somewhat and yet produce the same effect as described above. Also, the tape carrier may be manually slid through the air gap instead of using an automated transport. Although this invention was described in connection with erasing a reel of tape, this invention has equal applicability to cassettes or any other bulk storage tape carriers. Other modifications and variations will become apparent to one skilled in the art upon a study of the drawings, specification and appended claims.

We claim:

1. Apparatus for bulk erasing magnetic tapes spirally wound about an axis on a tape carrier, said apparatus comprising:
   first and second magnetic structures, each having a set of pole faces, each said set being arranged so that the pole faces of each structure oppose each other and are spaced by an air gap of sufficient width to receive the tape carrier therein; and
   circuit means coupled to the first and second structures for electrically producing a rotating magnetic field in the air gap substantially transverse to the tape carrier axis for erasing the tape by maintaining opposing pole faces in each structure with the same magnetic polarities.

2. The apparatus of claim 1 wherein said first and second magnetic structures each comprise a multi-legged iron core in which each leg includes current carrying windings thereon, opposing pairs of legs in each core being wound for opposite magnetic polarity, said cores mutually facing each other such that legs having the same magnetic polarity are in spaced alignment with each other; and wherein said circuit means includes means for supplying a first alternating current of a given phase to windings of a first pair of opposing legs in each of the cores, and said circuit means being further operative for supplying a second alternating current substantially 90° out of phase to the first current to a second pair of opposing legs in each core whereby a rotating magnetic field is generated in the air gap between the cores.

3. The apparatus of claim 2 wherein the legs of each core define an inner circumferential area substantially the same as the circumference of the tape in the carrier.

4. The apparatus of claim 2 wherein said circuit means includes power factor correction circuitry having a first capacitor for shifting the phase angle of the first current about 45° out of phase with AC line current, and a second capacitor of a value sufficient to shift the second current to about 135° out of phase with respect to the line current to thereby minimize current draw through the apparatus.

5. The apparatus of claim 1 which further comprises: means for attenuating the magnetic field in the air gap.

6. The apparatus of claim 5 wherein said attenuating means comprises:
means for conveying the tape carrier through the air gap.

7. The apparatus of claim 5 wherein said attenuating means comprises:
means for retracting the magnetic structures to increase the air gap therebetween.

8. The apparatus of claim 5 wherein said attenuating means comprises:
means for adjusting the electrical power supplied to the magnetic structures.

9. Apparatus for bulk erasing magnetic tape spirally wound about at least one axis of a tape carrier, said apparatus comprising:

a first structure having a first set of at least four magnetic poles depending therefrom parallel to a given axis, each pole including current carrying windings thereon wound so that opposing pairs of the poles in the first structure have opposite magnetic polarities;

a second structure having a second set of magnetic poles corresponding in number to the first set of poles, said second set of poles including current carrying windings thereon wound so that opposing poles in the second structure have opposite magnetic polarity, the second set of poles being spaced in opposed relationship with poles of the same magnetic polarity in the first structure by an air gap of sufficient width to receive the tape carrier therein; and circuit means coupled to the current carrying windings of the poles of the first and second structures for electrically producing a rotating magnetic field in a plane transverse to said given axis for erasing the tape in the tape carrier, said circuit means being operative to supply alternating currents of different phases to adjacent poles in each set while maintaining opposing poles across the air gap with the same magnetic polarities.

* * * * *